June 16, 1931.    G. F. ENDICOTT    1,809,836
HAND BRAKE
Filed March 31, 1927
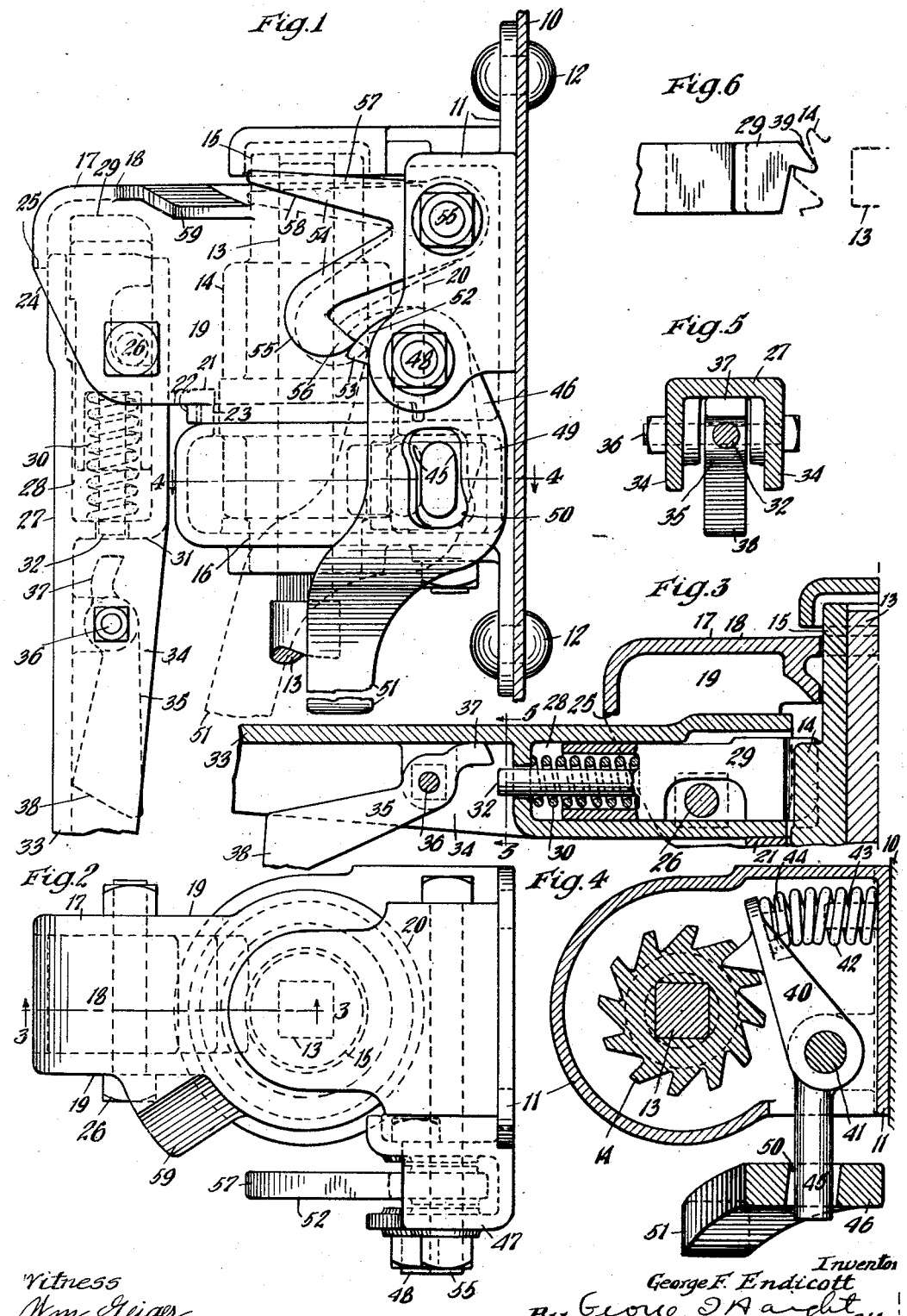
Witness
Wm. Geiger
Inventor
George F. Endicott
By George I. Awright
His Atty.

Patented June 16, 1931

1,809,836

UNITED STATES PATENT OFFICE

GEORGE F. ENDICOTT, OF ST. PAUL, MINNESOTA, ASSIGNOR TO W. H. MINER, INC., OF CHICAGO, ILLINOIS, A CORPORATION OF DELAWARE

HAND BRAKE

Application filed March 31, 1927. Serial No. 179,777.

This invention relates to improvements in hand brakes for railway cars.

In the operation of hand brakes of the vertical staff type, in which means are provided for rotating the staff to wind the brake chain thereon, ratchet mechanism is also provided for preventing accidental reverse rotation of the staff, and when it is decided to release the brakes, the release lever of the ratchet mechanism must be disengaged and manually held out of engagement until the brake chain has unwound sufficiently to release the brake shoes, and immediately the lever is released the same resumes its normally engaged position with the ratchet associated with the staff, preventing any further reverse rotation of the latter. Often the release pawl is engaged before the brake is fully unwound, resulting in a dragging of the brake shoes upon the wheels with consequent great wear and the necessity for increased tractive effort by the locomotive.

An object of the present invention is to provide, in a hand brake of the drop-handle type, means automatically operable upon movement of the operating parts of the brake, whereby movement of the release lever in a direction to release the holding pawl brings into operation elements which retain the pawl in released position, which elements themselves are released by movement of the operating mechanism of the brake when it is again desired to wind up the brake chain, independently of the position of the drop-handle in a vertical plane, thereby permitting the holding pawl to resume holding engagement with the ratchet, said release lever being of such character that operation of the same in opposite directions effects movement of the holding pawl in directions to release the same or to engage the same.

A further object of the invention is to provide an operating mechanism including ratchet means which normally effect rotation of the ratchet to wind up the brake chain, but which passes over the teeth of the ratchet in a reverse direction, in conjunction with detachable elements which may be engaged with the ratchet means whereby the latter may be utilized to rotate the brake staff in an unwinding direction to fully release the brake.

Other and further objects of the invention will more fully and clearly appear from the description and claims forming a part of this specification hereinafter following.

In the drawings forming part of this specification, Figure 1 is a vertical sectional view through the end wall of a car, showing a side elevational view of the hand brake mechanism with my improvements incorporated therein. Figure 2 is a top plan view of the brake mechanism. Figure 3 is a fragmentary vertical sectional view of the invention corresponding substantially to line 3—3 of Figure 2, but showing the operating lever in its raised or horizontal position. Figure 4 is a horizontal sectional view of the invention corresponding substantially to line 4—4 of Figure 1. Figure 5 is a transverse sectional view taken through one portion of the operating lever and corresponding substantially to the line 5—5 of Figure 3. And Figure 6 is a plan view of the pawl. As shown in the drawings, the end wall of the car is indicated at 10, to which is secured a housing or bearing bracket designated generally by the reference character 11. The housing 11 is secured to the wall by suitable rivets 12—12, and projecting into the housing is the usual vertical brake staff, a portion of which is indicated at 13, the staff being of square cross section at the top thereof to rigidly fit the ratchet wheel indicated at 14, the ratchet wheel being suitably mounted in the housing by journals 15 and 16, the ratchet wheel having upper and lower sets of teeth in the usual manner. Oscillatably mounted within the housing 11 is a carrier or fulcrum member 17, having a top wall 18, side walls 19—19, an inner end wall 20, and a bottom wall 21, the top wall 18 being provided with an opening which fits about the journal 15, while the bottom wall is provided with a flange 22 fitting about an upstanding bearing 23 on the housing, the outer end of the fulcrum member being open, as indicated at 24, and provided with a stop 25 which cooperates with the operating lever, as hereinafter described. The fulcrum member 17 is provided with a bolt 26 which extends through the side walls 19—19 thereof, adjacent the outer end of the same, and swingably mounted upon the bolt 26 is an operating lever 27. The lever 27 is provided with a chamber 28 adjacent its inner end in which is slidably mounted a pawl 29, said pawl being urged in a direction away from the free end of the lever by means of a coiled spring 30, one end of which bears upon the pawl 29 and the opposite end of which bears upon a web 31 forming the bottom of the chamber in which the pawl is mounted. The pawl 29 is also provided with an extension 32 which projects toward the free end of the lever through an opening in the web 31 when the pawl is in engagement with the ratchet wheel. The handle portion 33 of the lever 27 is formed with spaced walls 34—34 between which is pivotally mounted the gravity actuated latch 35 upon a pin 36 extending through the walls 34, as best shown in Figure 5, the latch having a cam portion 37 adapted to engage the adjacent end of the extension 32 on the pawl 29, and said latch has a weighted portion 38 which is adapted to rotate the latch member in a counter-clockwise direction when the operating lever 27 is raised to horizontal position to engage the sliding pawl 29 with the ratchet wheel 14. The pawl 29 is provided with a beveled portion 39 at one side, so that when the operating lever 27 is raised to horizontal position and swung in a clockwise direction, it will rotate the ratchet wheel 14, but will ratchet over the teeth of the ratchet wheel when moved in an opposite or counter-clockwise direction, unless the latch 35 is in engaged position.

To hold the staff 13 against reverse rotation, a locking pawl or dog 40 is provided and is pivotally mounted upon a bolt 41 disposed in the housing, said dog being adapted to engage the lower end of the ratchet wheel 14 and being normally urged toward engaged position with the ratchet wheel by means of a coiled spring 42, one end of which fits about a boss 43 on the wall of the bracket while the opposite end fits about a boss 44 on the inner engaging end of the dog 40. The dog 40 on the side of the pivot bolt 41 opposite to the engaging portion is provided with a short lever extension 45 which projects outwardly through a suitable opening in the housing, the extension 45 being substantially oval in cross section and of considerably less length than is usually provided in brakes of this character. The dog 40 is adapted to be operated by a release lever 46 which is arranged to be operated in a plane substantially parallel with the plane defined by the staff 13 in a manner which now will be described. In order to mount the lever 46 for its operative movements, the housing 11 is provided with an integral offset member providing a wall 47 spaced outwardly from the side wall of the bracket, and one end of the lever 46 is disposed between the wall 47 and the adjacent wall of the bracket and pivotally mounted upon a bolt 48 extending through the wall 47 and the adjacent wall of the bracket, the bolt 48 being disposed at right angles to the axis of the staff 13, whereby the lever 46 swings in a plane substantially parallel with the plane defined by the staff 13. The lever 46 depends from the bolt 48 within the plane of the extension 45 of the locking dog 40, and at this point is provided with a widened portion, as indicated at 49, which has an aperture 50 therein adapted to loosely accommodate the extension 45 on the dog 40, the walls defining the aperture 50 being inclined, as best shown in Figure 4, whereby angular movement of the extension 45 is permitted with respect to the lever 46 when swung to operate the dog 40. Below the portion 49, the lever 46 is offset to provide an extension 51 forming a handle by which the lever may be swung toward and from the wall 10 of the car for releasing and permitting engagement of the dog 40.

Means are provided for automatically locking the release lever to hold the dog 40 entirely free of engagement with the ratchet wheel 14 when the release lever 46 is moved in a direction to release the dog 40. Said means include a cam shaped member 52 formed upon the extreme end of the lever 46, and movable when the lever is operated, the cam portion being provided with a shoulder 53 adapted to cooperate with a latch member indicated broadly at 54. The latch member 54 is substantially in the form of a bell-crank lever, the elbow of which is pivotally mounted upon a pivot bolt 55 extending through the wall 47 and the adjacent wall of the bracket at a point above the pivot pin 48, one arm 55 of the bell-crank lever being provided with a hook portion 56 adapted to engage behind the shoulder 53 of the lever in one position of the parts. The other arm 57 of the bell-crank lever is provided with a cam face 58 adapted to cooperate with a laterally extending inclined web 59 formed integrally with one side wall of the fulcrum member 17, the web 59 being adapted to ride beneath the cam surface 58 of the arm 57 of the bell-crank lever to disengage the latch when the required movement is given to the fulcrum member 17.

In operation when it is desired to wind the brake staff in a direction to set the brakes, the lever 27 is elevated from its normal depending position to a horizontal position, causing engagement of the pawl 29 with the upper teeth of the ratchet wheel 14, the pawl 29 during this movement being pressed inwardly against the tension of the spring 30 causing projection of the extension 32 of the pawl toward the cam portion 37 of the latch in the lever; however, during the elevation of the operating lever 27, the cam portion 37 of the latch will be moved out of line with the extension 32 of the pawl 29, so that oscillation of the lever 27 in a counter-clockwise direction effects corresponding rotation of the staff 13, while oscillation of the lever 27 in the reverse direction causes the pawl 29 to ratchet over the teeth of the ratchet wheel, reverse rotation of the staff being prevented by reason of normal engagement of the dog 40 with the lower teeth of the ratchet wheel 14. The lever 46 during the winding movement of the brake hangs in its depending position, and due to the loose fit of the aperture therein with the extension 45 on the dog, ratcheting movement of the latter is permitted. With the lever 46 in this position, it will be noted that the hook portion 56 of the latch 34 rests upon the top surface of the cam member 52. When it is desired to release the brakes, the lever 46 is manually pulled in a direction away from the wall 10, and during this action the inner wall of the aperture in the lever 46 will engage the extension 45 and move the same in a clockwise direction, thereby disengaging the dog 40 from the ratchet wheel 14. During this movement the cam member 52 will move into such position as to permit the hook portion of the latch 54 to engage behind the shoulder 53 of the lever, so that return movement of the lever 46 is automatically prevented, and thus the dog 40 is held entirely free of the ratchet wheel 14, and permits the unobstructive unwinding of the brake chain. In addition, the unwinding of the brake chain may be positively effected by maintaining the lever 27 in its horizontal position so as to retain the pawl 29 in engagement with the ratchet wheel, and said pawl prevented from ratcheting over the teeth when the lever is swung in a clockwise direction by manually moving the weighted portion 38 of the latch in the handle to bring about engagement of the cam portion 37 of the latch with the adjacent end of the extension 32 on the pawl 29, thereby preventing ratcheting of the pawl 29 when the lever is moved in a clockwise direction. When the operator releases the latch, the pawl will again be free to operate under the influence of the spring 30.

In order to automatically reengage the pawl 40 when it is again desired to set the brakes, the fulcrum or carrier member 17 may be first oscillated in a counter-clockwise direction, by the drop-handle 33, so as to bring the inclined web 59 beneath the cam surface 58 of the latch 57, which rotates the latch about its pivot and retracts the hook portion thereof from engagement with the shoulder 53, permitting the lever 46 to drop and aiding and permitting the dog 40 to assume its engaged position with the lower teeth of the ratchet wheel.

Although I have herein shown and described what I now consider the preferred manner of carrying out my invention, the same is merely illustrative, and I contemplate all changes and modifications that come within the scope of the claims appended hereto.

I claim:

1. In a hand brake, the combination with a member adapted to be rotated to effect tightening of a brake chain; of a ratchet wheel connected thereto and rotatable therewith; operating mechanism having actuating means engageable with said member normally to effect movement of the member and wheel in unison therewith when moved in one direction and permitting relative movement with reference to said member when moved in a reverse direction; a releasable locking element for preventing reverse rotation of said ratchet wheel; means for latching said element in disengaged position when moved in a releasing direction; means for locking the actuating means of said operating mechanism to effect movement of said member in unison therewith in said reverse direction to effect unwinding of the brake chain; and means operable through movement of said operating mechanism in said first named direction for actuating said latching means to unlatch said locking element to render the same operative with respect to said ratchet wheel.

2. In a hand brake, the combination with a brake staff; of a toothed member movable with said brake staff; a locking dog co-operable with said toothed member, said dog being normally urged to operative engagement with said member and provided with an extension by means of which said dog may be released; mechanism for operating said dog, said mechanism being mounted to swing about an axis at an angle to the axis of rotation of said staff, and including a member by movement of which said extension is moved to release said dog from engaging position; latching means adapted to automatically engage said member when moved in a releasing direction to maintain the same in released position; operating mechanism for rotating said staff, including a member rotatable about said staff and a drop-handle pivoted thereto; and means carried by said rotatable member of the operating mechanism adapted in one position to engage said latching means to release the same.

3. In a hand brake, the combination with a member adapted to be rotated to effect tightening of the brake chain; of a ratchet wheel rotatable with said member; a pivoted locking dog, co-operable with said ratchet wheel, said dog being normally urged to operative position and having an extension thereon; a lever for operating said dog, said lever being mounted to swing about an axis at an angle to the axis of rotation of said member, and engaging said extension and adapted to co-operate therewith for operating said dog; a latching member co-operating with said lever and adapted to automatically engage the same to maintain said lever and said dog in released position; and operating means for rotating said member, including a member rotatable about a fixed axis and a drop-handle pivoted thereto, said rotatable member being provided wih a cam element adapted to engage said latching member for releasing its holding engagement with said lever and said dog.

4. In a hand brake, the combination with a member adapted to be rotated to effect tightening of the brake chain; of a ratchet wheel rotatable with said member; a carrier member mounted to oscillate about the axis of said ratchet wheel; an operating drop handle lever swingably mounted upon said carrier; a pawl carried by said lever and adapted to be engaged and disengaged with reference to said ratchet wheel depending upon the position of said operating drop handle lever, said pawl being normally operable when said drop-handle lever is raised to rotate said ratchet wheel in unison therewith in one direction, and ratcheting over said ratchet wheel when moved in the reverse direction; and manually actuated latch means pivoted on said lever swingable into engagement with the pawl to lock said pawl in engagement with said ratchet wheel whereby the latter may be rotated by said lever in unison therewith in said reverse direction, said latch means being automatically returned to disengaged position when released.

5. In a hand brake, the combination with a rotatable element adapted to have a brake chain wound thereon; of a toothed member rotatable with said element; a ratchet dog cooperating with said toothed member to lock the same against rotation in one direction and preventing rotation in a reversed direction, said dog being provided with an extension by which the same may be moved into and out of engaged position, yielding means normally urging the dog to engaged position; a release lever pivotally mounted adjacent one end to swing in a plane substantially parallel with said rotatable element, said lever intermediate its pivot and free end being provided with an abutment disposed at one side of said extension and adapted to cooperate therewith for operating said dog when said lever is actuated, said lever, at its pivoted end being provided with a locking shoulder; a latch in the form of a bell crank lever one arm of which is provided with a hook portion adapted in one position to engage the shoulder on said lever for locking the same and said dog in released position; operating means for rotating said rotatable element; and means carried by said operating means adapted to engage the other arm of said bell crank lever in one position to disengage the same and release said release lever and said dog.

6. In a hand brake, the combination with a brake staff; of a ratchet wheel mounted on said brake staff and movable therewith; a carrier member mounted to oscillate about the axis of said staff; an operating lever pivotally carried by said carrier member, a pawl carried by the operating lever, and being adapted to be moved into engaged and disengaged relation with respect to said ratchet wheel depending upon the position of said lever, said pawl when in engagement with said ratchet wheel being operative to rotate the latter in unison therewith when said lever is moved in one direction to tighten the brakes and to permit relative movement between said lever and ratchet wheel when the lever is moved in the reverse direction; means for detachably locking said pawl in position to effect rotation of said ratchet wheel with said lever in unison in said reverse direction to release the brakes; a locking dog for preventing retrograde rotation of said staff; means for releasing said dog, said means including a release lever engageable with said dog and a latch automatically engageable with said lever to maintain the locking dog in released position; and means mounted on said carrier member and cooperating with said latch upon movement of said carrier member by the operating lever in said brake tightening direction to release the latch from its holding engagement with said release lever.

7. In a hand brake, the combination with a rotatable winding member for a brake chain; of operating mechanism for rotating said member in a chain winding direction, said operating mechanism being normally freely movable with respect to said member in a reverse direction; a releasable dog normally engageable with said member for preventing rotation in the last named direction; means separate from the operating mechanism for automatically locking and holding said dog in disengaged position when said dog moved in a releasing direction; means for connecting the operating mechanism to the winding member to positively effect rotation of the latter in an unwinding direction; and means actuated through movement of said operating mechanism in chain winding direction for automatically disengaging the locking means from the dog, thereby rendering the dog operative to engage the winding member.

In witness that I claim the foregoing 1 have hereunto subscribed my name this 21st day of March, 1927.

GEORGE F. ENDICOTT.